Dec. 1, 1925.

F. J. BULASK 1,563,551

DISK RECORD APPARATUS

Filed May 3, 1920

Inventor
Francis J. Bulask

By Geo E Kirk

Attorney

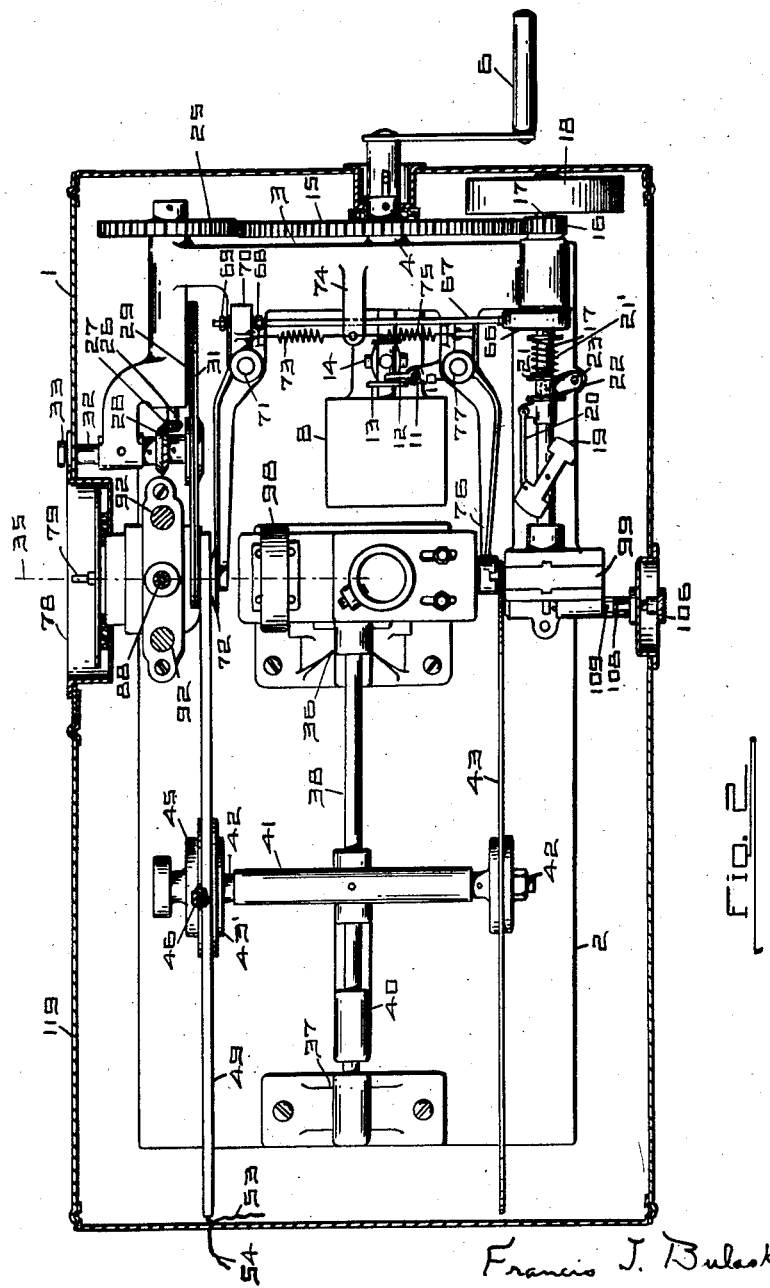

Dec. 1, 1925.  1,563,551
F. J. BULASK
DISK RECORD APPARATUS
Filed May 3, 1920  5 Sheets-Sheet 3
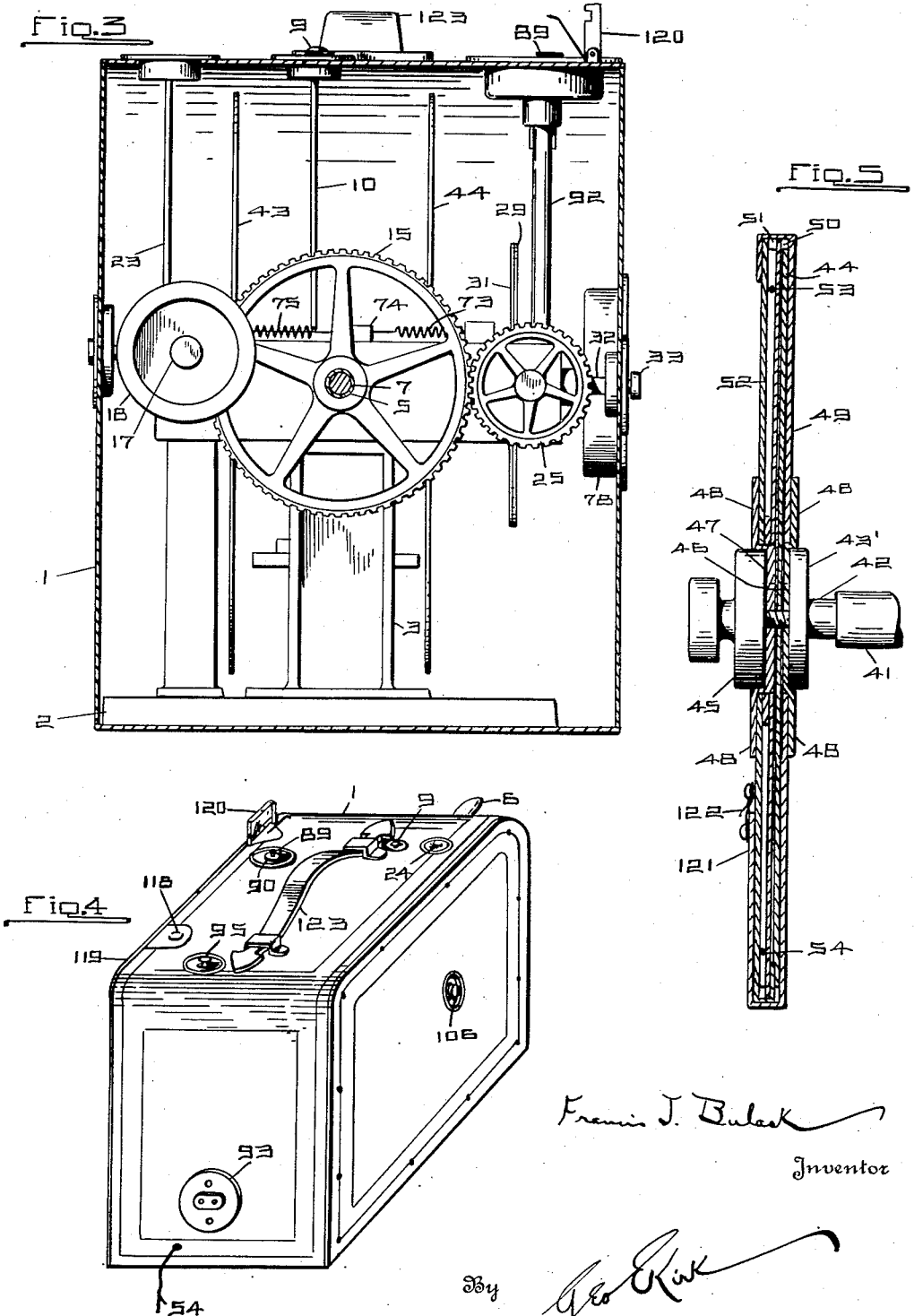

Dec. 1, 1925.
F. J. BULASK
1,563,551
DISK RECORD APPARATUS
Filed May 3, 1920
5 Sheets-Sheet 4
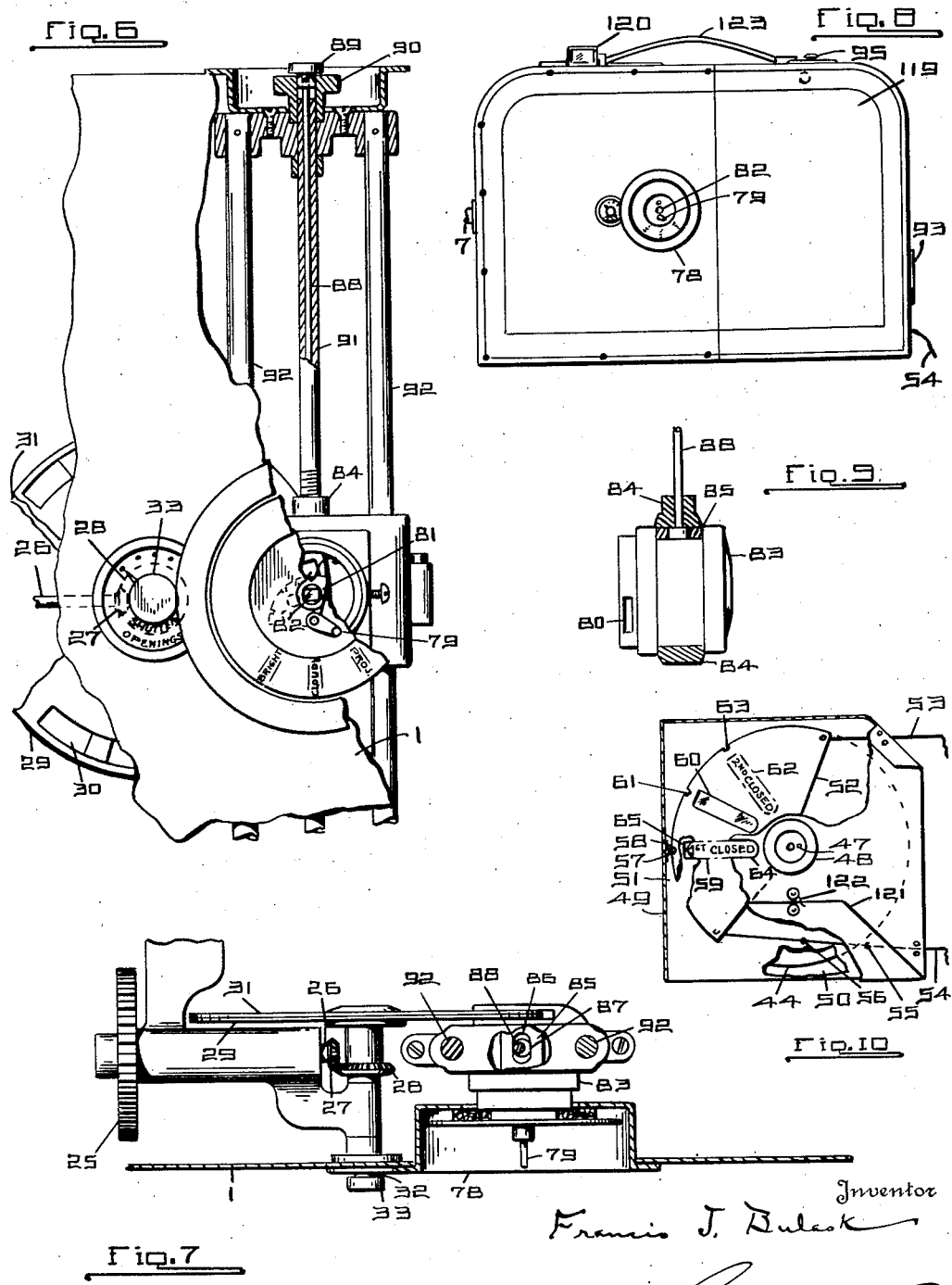

Dec. 1, 1925.  
F. J. BULASK  
DISK RECORD APPARATUS  
Filed May 3, 1920  
1,563,551  
5 Sheets-Sheet 5
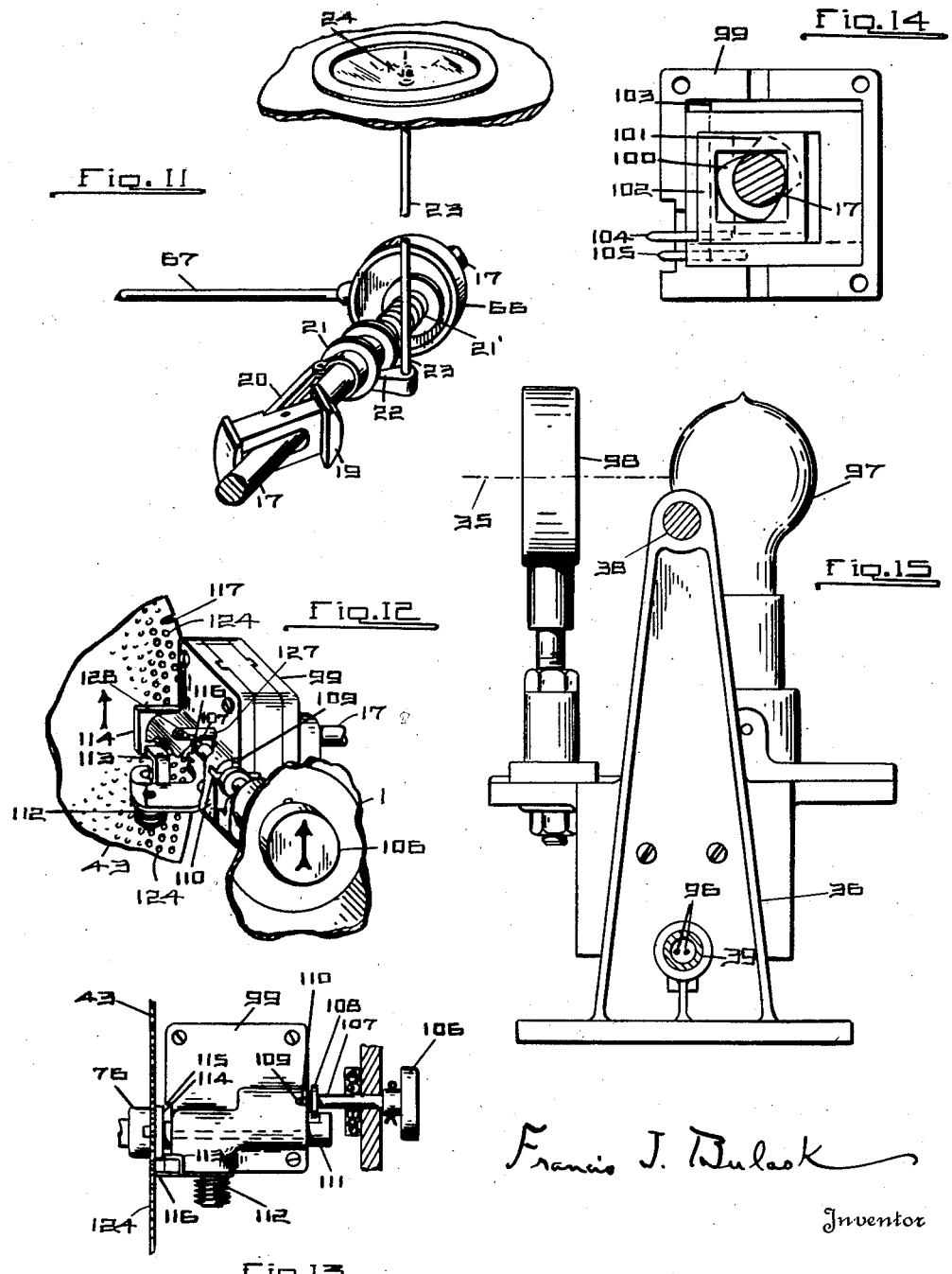

Patented Dec. 1, 1925.

1,563,551

UNITED STATES PATENT OFFICE.

FRANCIS J. BULASK, OF TOLEDO, OHIO, ASSIGNOR TO THE PICTURES DEVELOPMENT CO., OF TOLEDO, OHIO, A CORPORATION OF OHIO.

DISK-RECORD APPARATUS.

Application filed May 3, 1920. Serial No. 378,528.

*To all whom it may concern:*

Be it known that I, FRANCIS J. BULASK, a citizen of the United States of America, residing at Toledo, Lucas County, Ohio, have invented new and useful Disk-Record Apparatus, of which the following is a specification.

This invention relates to features of operation and control of record apparatus.

This invention has utility when incorporated in motion picture taking and projecting devices, especially in connection with disk records.

Referring to the drawings:

Fig. 2 is a plan view of the apparatus of Fig. 1, portions of the apparatus and the housing being broken away;

Fig. 3 is an end elevation of the apparatus of Fig. 1, the housing being broken away;

Fig. 4 is a perspective view of the apparatus of Fig. 1 in the housing or box;

Fig. 5 is a section through the loading envelop or film carrier for day-light loading;

Fig. 6 is a fragmentary showing of details of shutter adjustment as well as framing adjustment by lens shifting;

Fig. 7 is a plan view of the shutter and lens adjustment for framing features of Fig. 6;

Fig. 8 is a side elevation of the motion picture apparatus in its housing;

Fig. 9 is a fragmentary detail view of the transverse lens shifting feature for framing;

Fig. 10 is a side elevation, with parts broken away, of the loading envelop for day-light charging a picture taking film into this motion picture apparatus;

Fig. 11 is a fragmentary detail view, in perspective, of the speed indication features of the apparatus;

Fig. 12 is a fragmentary detail view, in perspective, of the cut-out or lock-out feature together with the drive for intermittent operation of the master disk;

Fig. 13 is a side elevation of this master disk control and drive;

Fig. 14 is a view of the actuating mechanism for intermittent driving of the master disk; and Fig. 15 is a detail view of the light and condenser for projection.

Figure 1:
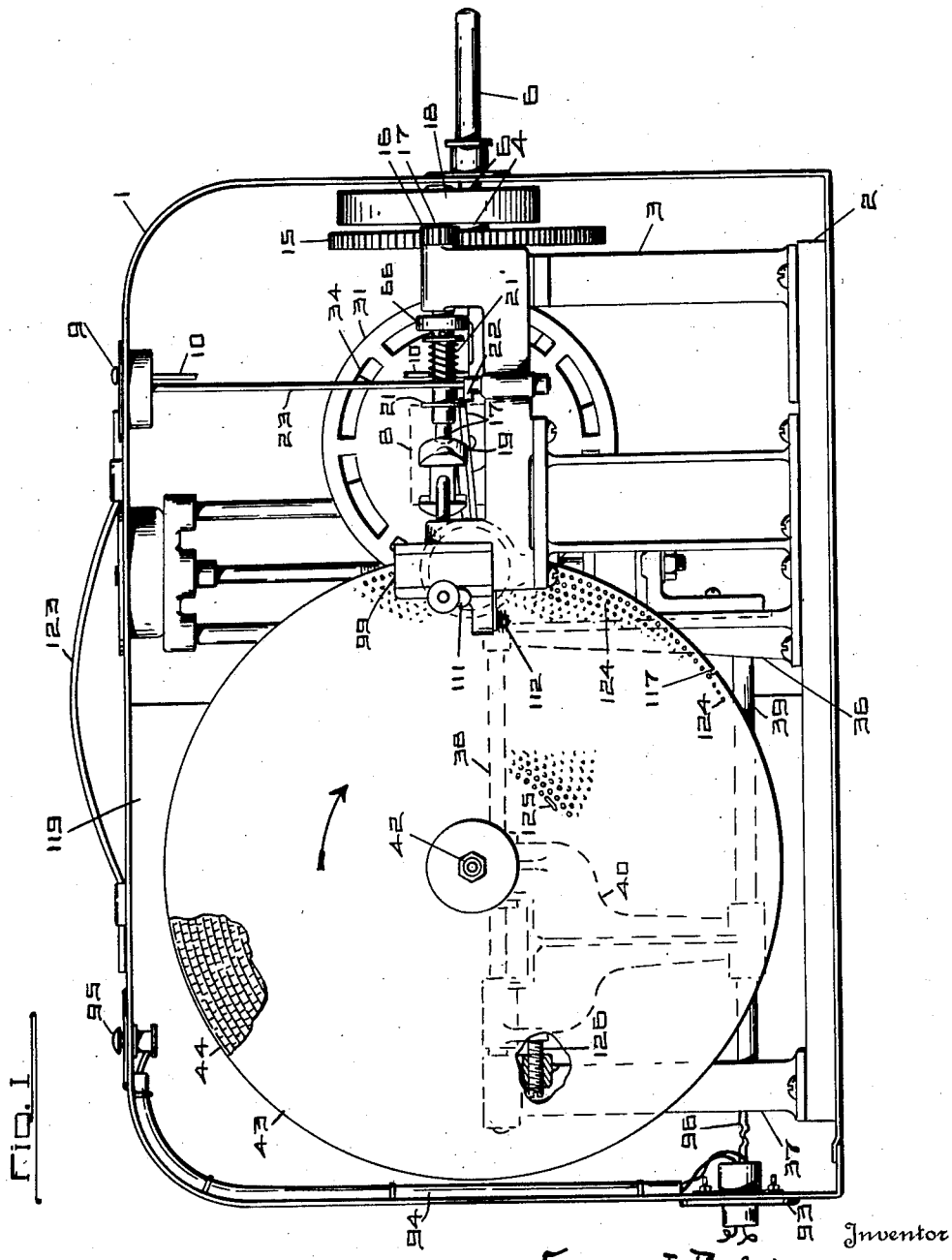
Fig. 1 is a side elevation of an apparatus embodying the invention, one portion of the side of the housing being taken away, and portions being broken away, of the device.

A housing or containing box 1 is shown as provided with a base 2 therein from which near one end upwardly extends a bracket 3 carrying a bearing 4 in which is disposed tubular shaft 5. A driving or winding crank 6 may rotatably engage a shaft 7 centrally disposed in the tubular shaft 5 for winding a spring motor 8, instead of more simply driving directly.

On the upper side of the casing or housing 1 is disposed a control knob or handle 9 downwardly from which extends a shaft 10, having at its lower portion a bearing 11. From this shaft 10 adjacent the bearing 11 laterally extends an arm 12 adjustable from the handle 9 to be moved toward and from a disk 13 shiftable longitudinally along shaft 5 by fly-weights 14. There is accordingly herein a manual adjustment for regulating the driving speed from the spring motor 8 in rotating the tubular shaft 5.

On this tubular shaft 5 to be driven from the spring motor 8 is a gear 15 in mesh with a pinion 16 on shaft 17 carrying flywheel 18. This is a speed multiplying device and the fly-weight 18 insures uniform angular velocity in the rotation of the shaft 17. This shaft 17 within the housing or casing 1 has fast thereon a fly-weight 19 connected by link 20 to shift sleeve 21 longitudinally of this shaft 17 against the action of compression spring 21'. Engaging between the collars of this sleeve 21 is an arm 22 for thereby oscillating upwardly extending shaft 23 which controls a pointer 24 for automatically indicating the driving speed of the spring motor 8 in operating the apparatus of this disclosure (Fig. 11).

In mesh with the gear wheel 15 oppositely from the pinion 16 is gear wheel 25 on shaft 26 carrying bevel pinion 27 in mesh with bevel gear 28 for rotating shutter 29 having openings 30 therein. Frictionally engaging with and opposing the disk 29 is a shutter disk 31 coaxial therewith and mounted on shaft 32 having protruding from the housing 1 a handle 33 for angularly shifting this disk 31 as to the disk 29 so that the register relation of openings 34 in the disk 31 may be adjusted as to the openings 30 in the disk 29, thereby varying action of the shutter in providing openings in light line 35 of the apparatus in the housing 1.

On the base 2 in the housing 1 are disposed up-standing brackets 36, 37, between which extend upper rigid bar 38 and a lower rigid bar 39, upon which is shown reciprocable a bracket 40, the upper portion of which carries a transverse bearing 41 for a rotary shaft 42. On the rearward or after side of this bearing 41 the shaft 42 carries a master disk 43. On the forward side this shaft 42 carries a flange 43′ which in the operation of the apparatus for projecting will engage a disk record of views. This disk record 44 is held in position against the flange 43′ by an opposing flange 45 on the shaft 42. The angular position of this disk record 44 is fixed as to the shaft 42 by a pin 46 entering an opening 47 in the disk or record 44 (Figs. 1, 2, 5).

In the day-light loading of this motion-picture apparatus with film of disk record type, instead of the film 44 being directly engaged by the opposing disks or flanges 43′, 45, centrally concave bearing members 48 are disposed to mount an envelop 49 which has a pair of pockets 50, 51. In the pocket 50 may be disposed the film 44 for having taken thereon the series of views as a disk record. In the adjacent or outer pocket is disposed a segmental section 52, (Figs. 5, 10) having from the upper portion thereof a resetting string 53, extending to without the envelop 49, and from the lower portion thereof an oppositely extending string 54, this latter string having knots 55, 56, therein as an additional indication besides stop spring 57 engaging peripheral notch 58. This notch 58 is disposed at first closed position 59 as indicated in the region of light line travel transversely of this envelop in disk record taking of pictures by the apparatus of this disclosure.

With this day-light loading envelop 49 charged into the camera or housing 1, the string 54 may protrude without the box or casing 1 as shown in Fig. 4. This string may be pulled to have knot 55 reach the outside when window 60 is in the region of the light line 35 and at this time there is additional indication besides knot 55 by spring 57 falling into notch 61. When the taking operation has been completed, the envelop 49 may be closed by still further pulling the string 54 until knot 56 is accessible when third or closed position indicated by closure 62 notation on the segment 52 is visible at the window 64 in the envelop 49 at which time the spring 57 engages notch 63. Accordingly, positions 59, 60, 62, may successively be brought in position with window 64, first and last for shielding the film from light and intermediately for view taking exposures through windows 64, 60, 65, the latter being in the partition between the pockets 50, 51.

Fixedly mounted on the shaft 17 is an eccentric embraced by an eccentric strap 66 connected to rod 67 having thereon nuts 68, 69, with slight clearance as to arm 70 of lever pivoted on fulcrum 71, whereby in the rotation of the shaft 17 there may be given slight reciprocation of the lever having presser foot 72 on the remote end thereof. This presser foot is normally held in position against the film or disk record 44 to preclude vibration thereof in the region of the light line by the action of the spring 73, but during the intermittent rotation of this driving device for shifting the views, this presser foot 72 is released from contact with the record 44. From a bracket 74 oppositely extending from the spring 73 extends spring 75 to lever 76, which acts as a presser foot against the master disk 43. This presser foot 76 of the master is rockable on fulcrum bearing 77 in the operation of the spring 75.

In cup 78 of the side of the housing is disposed a crank 79 connected by an arm through opening 80 to shift an opening adjusting plate 81 to thereby vary the amount of light admitted to lens 82, (Figs. 6, 7, 9). This adjustment is of advantage in adjusting the shutter or light opening in taking pictures. A lens housing or barrel 83, (Fig. 9) is provided, having a yoke 84 which in its upper portion is shown as carrying a block 85, (Fig. 7) having a longitudinally extending slot 86 for engagement by an eccentric 87 on upwardly extending rod 88 terminating near the top of the case 1 in a thumb nut 89, which in rotation may serve to laterally shift the barrel 83 with the lens and thereby adjust the horizontal framing of the lens in picture projection.

For additionally adjusting the framing in the direction of disk travel of the several views, there is shown adjacent the thumb portion 89, an additional thumb wheel 90 on downwardly extending sleeve 91. This sleeve 91 has threaded engagement with the yoke 84 so that this yoke 84 may be reciprocated to carry upward or downward on slide rods 92 the barrel 83 of the lens. Accordingly, there may be this adjustment up and down by the wheel 90 in adjusting the lens for vertical framing in the direction of view travel while the adjustment by hand wheel 89 is transversely of the lens views in completing the framing in two directions.

In picture projection, current supply may be by way of plug at plate 93 to permit connection through conduit 94 with switch 95 in the upper portion of the case 1, (Fig. 1) whereby electric current flow may be controlled through line 96 in tubular bar 39 to light 97, (Fig. 15) disposed in light line 35 for projecting through condenser 98 and through the lens barrel 84 in the line of the lens.

The intermittent driving of the master disk 43 is effected from mechanism in box 99 into which driving shaft 17 extends. This shaft 17 in the box 99 has thereon eccentric or cam portions 100, 101, respectively in engagement with blocks 102, 103, carrying pins 104, 105. The latter pin is a holding pin, merely moving into an opening in the master disk 43 to hold the disk, while the pin 104 is withdrawn therefrom to progress again into another hole and then the pin 105 is withdrawn while the pin 104 shifts the disk 43 one step forward to thereby carry the record 44 a space forward for a view taking or projecting position. During operation, one pin is always in the disk before the other is removed.

There is simple mechanism provided herein for handling or shifting the master disk 43, and with it the film, independently of the driving mechanism. This feature has utility for going back to start, without running through a complete disk or record, as well as for initially setting the record into proper registering position.

On the back of the housing casing 1, (Figs. 4, 12.) is a thumb member 106 on a shaft 107 provided with a collar 108 and a pin 109. When this pin 109 is in recess 110 of the box 99, the master disk 43 is flexed to move off or clear of pins 104, 105, for slide 111 moves inward as actuated by torsion spring 112, together with swinging stripper plate 113 against block 114. This block 114 as so moved with its bar 111 against master disk 43 overcomes the action of the presser foot 76 in shifting the master disk 43 out of the region of the pins 104, 105. When the thumb wheel 106 is pulled outward to have pin 109 clear slot 110 in the block 99, this shaft 107 may be rotated to bring the pin 109 out of alignment with the slot 110. This outward movement of the shaft 107 has collar 108 engage the bar 111 to move the block 114 and swing member 113 against the action of spring 112 so that the block 114 comes into recess 115 of the housing 99. In this position the master disk is free to be driven. When the thumb wheel 106 is thrown to the locked position for initiating the starting of the apparatus, swing member 113 has a forward extension 116 which may register with peripheral notch 117 in the master disk 43, thus determining positively the fixed or starting position.

For loading the camera with a film in the envelop or disk record on which the views have been developed, spring latch 118 may be depressed so that hinge section 119 of the housing 1 may be swung outward, thereby giving access to the inside of the housing 1, permitting removal of outer flange 45 and the mounting or dismounting of the records on the shaft 42.

Sight glass 120 is hinged to the upper side of the casing 1 and may be used as a view finder when the camera is used for picture making. The flap 121 may be opened by untwisting string 122 for gaining access to record pocket 50 of the day-light loading envelop, (Figs. 5, 10). The housing or camera box 1 is shown as provided with a handle or lifting strap 123.

The holes 124 in the master or actuator disk 43 are arranged in a spiral series which has an inward terminus, radially from the notch 117, in slot 125. Accordingly when the inward driving progress of the pins 104, 105, in the holes 124 brings the master disk 43 so that the pins 104, 105, are each in a common opening, the slot 125, there is no further actuation, and this feature of the pins 104, 105, being in position to drive but not driving, is in synchronism with the shutter closing the light line 35, so there is not exposure to injuriously effect the film 44 after driving ceases. By knob 106, the pins 104, 105, may be withdrawn from the master by having the stripper plate flex the master away therefrom. The film may be removed by operating the string 54 to close the envelop window, and then removing through the door 119. A new film or record on shaft 42 is positioned by drawing bracket 40 to abut adjustable stop 126 which is so positioned that one of the pins 104, or 105 may enter an opening 124 near the notch 117 as a starting point for initiating master disk driving, as extension 116 disengages the notch 117.

The starting of the operation, say for taking from a film, is positively fixed as to a line of light for the shaft 107 in its sliding forward to have the pin 109 enter the notch 110, thrusts the reduced inner end of the shaft 107 into the region of the smaller diameter terminus 127 of the shaft 17. This shaft portion 127 has therein a recess 128 which is entered by the reduced end of the shaft 107, thereby positively locking the driving mechanism interconnected with the shutter 31. The position of this recess 128 is such that the shutter 31 is in light intercepting position as the mechanism is locked, so there is positive locking of the mechanism with light cut off from entering thereinto. With some thicknesses of master disks, or wherein the series of openings may not extend too far centerward, there may be flexing thereof by the spring 112, to permit locking of the driving mechanism to be maintained by the holding of the spring 112. However, a thrusting of the rod 107, by the handle 106, inward, at once the slot 125 is effective to discontinue driving of the disk 43, insures the final stopping of the shutter 31 in light intercepting position, as the shaft 107 enters the opening 128 in the end 127 of the shaft 17.

What is claimed and it is desired to secure by Letters Patent is:

1. A motion picture apparatus comprising a disk record, a control disk for the record provided with seat means, and a device manually shiftable into and out of registry with the seat means for fixing an angular position for the control disk and record.

2. A motion picture apparatus comprising a disk record, a control disk for the record provided with a peripheral notch, a housing for the disks, and a device manually shiftable from outside the housing for fixing an angular position of the record by coacting with the notch.

3. A motion picture apparatus including a mounting for a film embodying a live shaft for effecting rotation of a film, daylight loading means for loading a film into position on said shaft, said film having a shaft receiving opening, and a mounting for the loading means as to which the film is normally rotatable by said line shaft.

4. A motion picture apparatus including a live mounting shaft for a film, a housing for the film, and a window providing non-rotary envelop for loading a film into the housing upon said shaft for film rotation by said shaft.

5. A multiple view disk film daylight loading envelop provided with a window and a closure for the window, said film having a mounting seat connectable with an actuator through the envelop for normally driving the film as to the window by said actuator.

6. A motion picture apparatus including a flexible perforate master disk, driving means for actuating the master disk by engaging the master disk perforations, and comprising pin means, and a stripper plate manually shiftable to flex the disk off the pins.

7. A motion picture apparatus comprising a housing, a rotatable mounting for sustaining a film in said housing, driving means for shifting the mounting and film in the housing, and a daylight envelop for the film, said film being normally rotatable as to said envelop by said mounting.

8. A motion picture apparatus comprising a housing, a rotatable mounting for sustaining, rotating and shifting a disk film, and a light excluding envelop for enveloping the film, said film being normally rotatable as to said envelop by said mounting.

9. A motion picture apparatus comprising a housing, a traveling rotatable mounting for sustaining a disk film, said housing being provided with an opening, and a light excluding envelop insertable in the housing through said opening with a film to be anchored on the mounting in the envelop for normal film rotation independently of said envelop by said mounting.

10. A motion picture apparatus comprising a housing, a bearing for a disk film in said housing, a light excluding envelop provided with a film chamber therein, said envelop mountable to carry the film chamber in position so that a film therein may be mounted on said bearing, and driving means for rotating the bearing for shifting the film as to the envelop in normal film operation of rotation with said bearing and driving means.

11. A motion picture apparatus comprising a housing provided with a film charging opening, a bearing for a disk film in said housing, a light excluding envelop having a film chamber provided with a radially extending slot shaped opening as to which the film may rotate, and a closable window for the opening, a light entrance means into the housing, and means for mounting the envelop with a film in its film chamber in position so that the window may be opened for light action therethrough from the means to the film.

12. A motion picture apparatus comprising a housing provided with a film charging opening, a movable mounting for a film in said housing, a light excluding envelop having therein a film chamber provided with a radially extending slot shaped window as to which the film may rotate, means for closing the window in the envelop as a film in the envelop is charged into the housing through the film opening, and means accessible from the exterior of the closed housing for opening the window by shifting said window closing means independently of shifting the film.

13. A light excluding envelop for charging a film into a camera, said envelop having a radially extending slot shaped window as to which the film may rotate, a closure for the window, and means for shifting the closure to open and to close the window.

14. A motion picture apparatus comprising driving mechanism for intermittently actuating a film and including a master disk provided with a spiral series of perforations terminating in a slot, and actuating means for the disk including a driving pin and a guide for the pin extending perpendicularly to the disk whereby said pin in coacting with the perforations of the disk is ineffective for driving the disk when reaching said slot.

15. A motion picture apparatus comprising a housing provided with a way for a light line, shutter means for intermittently intercepting said light line, film actuating mechanism including a member provided with a series of seats terminating in an elongated seat, and driving means for the member and shutter, said driving means actuating said member by coacting with said seats until riding into said elongated seat to locate a light line intercepting period of the shutter during member rest, said driving means including a pin and a guide for the pin extending perpendicularly to the member.

16. A motion picture apparatus comprising a housing provided with a way for a light line, rotary shutter means for intermittently intercepting said light line, disk film actuating mechanism including a master disk coaxial with a film, said disk provided with a spiral series of seats inwardly terminating in an elongated seat, and driving means for rotating the shutter and intermittently actuating the master disk, said driving means including a guide extending perpendicularly to the disk, and a pin in said guide coacting with said seats until riding into said elongated seat to there locate a period of rest for the master disk and film in a light line intercepted position of the shutter.

In witness whereof I affix my signature.

FRANCIS J. BULASK.